(12) United States Patent
Misawa et al.

(10) Patent No.: US 8,672,410 B2
(45) Date of Patent: Mar. 18, 2014

(54) TILTABLE HEADREST DEVICE

(75) Inventors: Satoshi Misawa, Kasugai (JP); Takeshi Mizutani, Komaki (JP)

(73) Assignees: Tokai Chemical Industries, Ltd., Kani-gun (JP); Rebirth Co., Ltd., komaki-shi (JP)

( * ) Notice: Subject to any disclaimer, the term of this patent is extended or adjusted under 35 U.S.C. 154(b) by 303 days.

(21) Appl. No.: 13/165,480

(22) Filed: Jun. 21, 2011

(65) Prior Publication Data

US 2012/0326480 A1    Dec. 27, 2012

(51) Int. Cl.
*B60N 2/48*    (2006.01)

(52) U.S. Cl.
USPC ............................... 297/408; 297/403

(58) Field of Classification Search
USPC .................................. 297/403, 408
See application file for complete search history.

(56) References Cited

U.S. PATENT DOCUMENTS

| | | | | |
|---|---|---|---|---|
| 2,828,810 | A * | 4/1958 | Barecki et al. | 297/396 |
| 3,429,615 | A * | 2/1969 | Belk | 297/410 |
| 5,238,295 | A * | 8/1993 | Harrell | 297/408 |
| 6,129,421 | A * | 10/2000 | Gilson et al. | 297/408 |
| 6,634,715 | B2 * | 10/2003 | Nakane et al. | 297/408 |
| 6,880,890 | B1 * | 4/2005 | DeBrabant | 297/408 |
| 7,648,200 | B2 * | 1/2010 | Oda | 297/216.12 |
| 7,758,126 | B2 * | 7/2010 | Haase | 297/408 |
| 2006/0226690 | A1 * | 10/2006 | Neale | 297/408 |
| 2011/0254339 | A1 * | 10/2011 | Bruck | 297/403 |

FOREIGN PATENT DOCUMENTS

| | | |
|---|---|---|
| JP | Y2-54-059906 | 4/1979 |
| JP | Y2-61-032529 | 10/1982 |
| JP | U-59-125263 | 8/1984 |
| JP | U-2-121847 | 10/1990 |
| JP | A-11-011199 | 1/1999 |
| JP | A-11-348630 | 12/1999 |
| JP | A-2000-052525 | 2/2000 |
| JP | A-2002-125792 | 5/2002 |
| JP | A-2009-240415 | 10/2009 |

OTHER PUBLICATIONS

Apr. 25, 2013 Office Action issued in Japanese Patent Application No. 2008-322423 (with translation).

* cited by examiner

*Primary Examiner* — Peter Brown
(74) *Attorney, Agent, or Firm* — Oliff PLC (57) ABSTRACT

A tiltable headrest device is provided to suppress the occurrence of abnormal noise during rotation, to reduce the number of components and to improve appearance quality. Guide portions (12) each comprising a standing-up locking portion (12a), a falling-down locking portion (12b) and a rail portion (12c) are integrally formed on a core member (1), a coil spring (4) for urging a lateral rod (31) toward a direction approaching the guide portions (12) is provided in the core member (1). The lateral rod (31) is pressed to the guide portions (12) by the urging force of the coil spring (4) so as to be guided. Due to sliding contact between resin and metal, the occurrence of abnormal noise can be prevented.

2 Claims, 7 Drawing Sheets

TILTABLE HEADREST DEVICE

FIELD OF THE INVENTION

The present invention relates to a tiltable headrest device for vehicle, and relates to a tiltable headrest device which is capable of rotating between a standing-up position which is an in-use state and a falling-down position which is a not-in-use state.

BACKGROUND OF THE INVENTION

In recent years, it is desirable that, in a vehicle, a headrest for an unoccupied seat may be lain down to a forward direction or a backward direction so as to ensure the rearward visibility.

JP S61-032529U discloses a headrest in which a frame attached to a headrest body is held in such a manner as to be rotatable about a lateral rod of a stay and shiftable along an axis direction. In such a headrest, the frame is integrally formed with a stopper device, and locking members extending from the lateral rod of the stay are locked by two grooves formed on the stopper device, thus the headrest can be held at the standing-up position and the falling-down position at which the headrest is lain down backward. Therefore, since resistance force may not occur during the movement for standing-up or falling-down, an operability become excellent.

Furthermore, on the micro-film of JP S54-059906U (Japanese Utility Model Application No. S52-128298), a headrest structure for a barber chair, which is tiltable backward, is disclosed. In such a headrest structure, a rotation shaft of the headrest is rotatably held by a pair of brackets fixed on the chair, and the headrest is held at an in-use position by engaging a locking rod formed on the rotation shaft with grooves of the brackets. Moreover, the headrest is moved in an axial direction of the rotation shaft by overcoming a urging force of a coil spring, and the engagement between the locking rod and the grooves is released, thus the headrest can rotate backward.

Furthermore, in JP 2000-052825A, a headrest provided with a metal tiltable mechanism is disclosed.

However, in a case that the headrests disclosed by these publications are formed by means of integrally foam-molding, there is a possibility that foamed resin may come into the above-mentioned tiltable mechanism, and the operation of the tiltable mechanism may be hindered.

In view of this, a headrest is disclosed in JP H11-348630A, in which a tiltable mechanism is covered with an inner cover, ends of a covering member are clamped by fitting an outer cover with a stay-insertion portion provided on the inner cover in an engaged state, and a pad is foam-molded between the covering member and the inner cover. Accordingly, the foamed resin can be prevented from permeating into the tiltable mechanism, and a leakage of the foamed resin to the surface side of the covering member can also be prevented.

Moreover, a method, in which the metal tiltable mechanism as described in JP2000-052825A or JP H11-011199A is used, a cover for regulating the foamed resin from permeating into the tiltable mechanism is formed by blow-molding, and a foam-molding is performed by disposing the same in a die for foam-molding, is also being employed.

However, this will cause problems that the metal tiltable mechanism becomes heavy in weight, and, because metal parts slidingly contact each other and thus noise suppression means becomes necessary, the number of components is increased. Moreover, the headrest manufactured in this way becomes expensive because the outer cover is necessary and a blow-molding is required.

Furthermore, in the conventional tiltable headrests, because it is necessary to form long holes in a core member, which function as passages for the leg portions of the stay to move between the standing-up position and the falling-down position, and which are exposed, there is a problem that an appearance of the headrests is deteriorated.

SUMMARY OF THE INVENTION

Problems to be Solved by the Invention

The present invention has been made in view of the above-mentioned problems, and is aimed to providing a tiltable headrest device which is capable of preventing the foamed resin from coming into the tiltable mechanism portion while suppressing abnormal noise during rotation from occurring, and the number of components of which is reduced so that the weight and the cost thereof are reduced while an excellent appearance is achieved.

Means for Solving the Problem

A tiltable headrest device of the present invention for solving the above-mentioned problems comprises a substantially U-shaped stay, which comprises a pair of leg portions extending substantially in parallel with each other while being spaced apart from each other and a lateral rod for connecting the pair of the leg portions, and a core member made of resin for surrounding at least the lateral rod of the stay, wherein the core member is held by the stay at a substantially upright standing-up position and a falling-down position lain down from the standing-up position respectively, characterized in that guide portions are integrally formed on the core member, each guide portion comprises a standing-up locking portion for locking the lateral rod at the standing-up position, a falling-down locking portion for locking the lateral rod at the falling-down position, and a rail portion for connecting the standing-up locking portion and the falling-down locking portion so as to guide the lateral rod, an urging member for urging the lateral rod toward a direction approaching the guide portions is provided in the core member, wherein the lateral rod is pressed to the guide portions by the urging force of the urging member so as to be guided.

Effects of the Invention

According to the tiltable headrest device of the present invention, because the guide portions are integrally formed on the core member and the lateral rod of the stay is configured to slidingly contact with the guide portions, the occurrence of abnormal noise is suppressed due to sliding contact between resin and metal. Accordingly, since noise suppression means is no longer required, the number of components is reduced. Furthermore, since the metal tiltable headrest mechanism is not required, the weight of the tiltable headrest device of the present invention is also reduced.

The urging member preferably comprises a coil spring. In this case, both ends of the coil spring are preferably held respectively by the lateral rod and a spring mounting portion formed in lower part of the core member, and the coil spring is preferably configured to be always urged to having an urging force in a stretching direction. In this way, since the headrest body is pressed towards the seatback against the urging force, a state that the lateral rod of the stay is locking by the standing-up locking portion or by the falling-down locking portion can be released. Therefore, the operability is improved compared with a case of raising the headrest and moving the same in the lateral direction. Moreover, the coil spring can be disposed in an inevitably existing space between the lateral rod and the base of the core member, thus it is not necessary for the core member to be large in size.

The urging member is preferably configured such that the urging force is larger when the lateral rod is located at the rail portion than that when the lateral rod is locked by the standing-up locking portion or the falling-down locking portion. With such a configuration, by means of the urging force, the lateral rod abutting against the rail portion is configured to move automatically or be moved by a small force toward the standing-up locking portion or the falling-down locking portion, thereby the operability becomes excellent.

It is desirable that slide members are held on the pair of the leg portions at positions closing to the lateral rod, each slide member comprises a slide portion slidable along the leg portion and a pin portion protruding outward from the slide portion toward a direction parallel to the lateral rod, and it is desirable that the core member is configured to have integrally formed holding portions for rotatably holding the pin portions. Having such slide members, the pin portions function as a center of rotation, therefore, the center of rotation of the core member when being tilted is lower than the lateral rod of the stay. Accordingly, with respect to the core member, a length from the center of rotation of the core member to a lower end portion of the core member is reduced; therefore, a movement distance for the lower end portion of the core member during rotation can be reduced, thus a length of stay holes which serve as passages for the movement of the leg portions of the stay can be reduced, and thus the appearance is improved. Furthermore, in a state where the lateral rod is guided by the rail portions of the guide portions, the pin portions held by the holding portions serve as the center of rotation, thus the stability of rotation is improved.

Moreover, it is desirable that the core member is configured to have corner portions in the lower end portion thereof with the holding portions being formed closing to the corner portions. By using such a configuration, long holes which function as passages for the movement of the leg portions of the stay can be further reduced in length, thereby the appearance is further improved.

DESCRIPTION OF SPECIFIC EMBODIMENTS

The tiltable headrest device of the present invention comprises a substantially U-shaped stay having a pair of leg portions and a lateral rod for connecting the pair of leg portions, and a core member made of resin surrounding at least the lateral rod of the stay. As for the stay, a stay made of a metal pipe is generally used, as used in conventionally used stays. Moreover, the core member is made of resin and generally comprises two split bodies, wherein after each of the split bodies is formed separately, the split bodies are combined to form the core member in such a manner that at least the lateral rod of the stay is included therein. The means for the combination includes but does not particularly limit to welding, screw joining, claw fitting, or the like.

Guide portions are integrally formed on the core member. The guide portions each comprises a standing-up locking portion for locking the lateral rod so that the core member is at a substantially upright standing-up position, a falling-down locking portion for locking the lateral rod so that the core member is at a falling-down position, and a rail portion for connecting the standing-up locking portion and the falling-down locking portion so as to guide the lateral rod. The standing-up locking portions and the falling-down locking portions may be formed to have, for example, groove shapes for accepting the lateral rod. Alternatively, protruding wall portions may be formed to abut against the lateral rod so as to serve as the standing-up locking portions or the falling-down locking portions.

An urging member for urging the lateral rod toward a direction approaching the guide portions is provided in the core member. The urging member may be formed by using elastic body such as various springs or rubbers, and particularly it is preferred to use coil spring which exerts a large urging force with a small profile. In a case where a coil spring is used, one end thereof is held by the lateral rod and the other end is held by a spring mounting portion formed on the core member. It is preferably configured such that the spring mounting portion is formed in lower part of the core member and the lateral rod is located thereover, and an urging force in a stretching direction is always exerted to the coil spring. In this way, the coil spring can be disposed between the pair of leg portions of the stay, thereby a space within the core member is effectively used.

Moreover, according to the configuration as described above, the lateral rod can be released from locking with the standing-up locking portions or the falling-down locking portions by pressing a headrest body toward the seatback; therefore, an operability thereof becomes excellent compared with a case where the headrest is raised and moved in the lateral direction.

The rail portions of the guide portions are each preferably configured to have a curved surface having a convex arc shape in sectional view and smoothly connect the standing-up locking portion and the falling-down locking portion so as to guide the lateral rod. By using such a curved surface having a convex arc shape in sectional view, a distance between the spring mounting portion and the rail portion is longer than a distance between the spring mounting portion and the standing-up locking portion or the falling-down locking portion while maintaining a constant distance; accordingly, the urging force of the urging means is larger when the lateral rod locates at the rail portions than that when the lateral rod is locked at the standing-up locking portions or the falling-down locking portions. Therefore, the lateral rod abutting against the rail portions is capable of automatically and smoothly moving toward the standing-up locking portion or the falling-down locking portion, thus the operability becomes excellent.

In addition, it is necessary to form a space for allowing the stay to move as described above in the core member. Therefore, when the lateral rod is guided by the guide portions and moves, the positional relationship between the stay and the core member is not fixed, thus the rotation is likely to become unstable. Accordingly, It is desirable that slide members are held on the pair of the legs respectively at positions closing to the lateral rod, each of which comprises a slide portion slidable along the leg portion and a pin portion protruding outward from the slide portion in a direction parallel to the lateral rod, and holding portions by which the pin portions are rotationally held, are formed integrally on the core member.

By providing such slide members, in a state that the lateral rod is being guided by the rail portions of the guide portions, the pin portions held by the holding portions serve as a center of rotation, thus the stability of rotation is improved. Furthermore, since the center of rotation of the core member when being tilted is lower than the lateral rod of the stay, the length from the center of rotation of the core member to the lower end portion of the core member is reduced, and the movement distance of the lower end portion of the core member during rotation can be reduced. Therefore, stay holes which serve as passages for the movement of the leg portions of the stay can be reduced, thus the appearance quality is improved. In addition, if the slide members are formed of resin, the occurrence of abnormal noise during rotation can be prevented.

Moreover, it is desirable that the core member has corner portions at its lower end portion when the core member is at the standing-up position, and the holding portions rotationally holding the slide members are formed closing to the corner portion. According to such a configuration, stay holes which serve as passages for the movement of the leg portions of the stay can be further reduced, so that the appearance quality is further improved.

EMBODIMENTS

The present invention will be described in detail with reference to the following embodiments.

The First Embodiment

Figure 1:
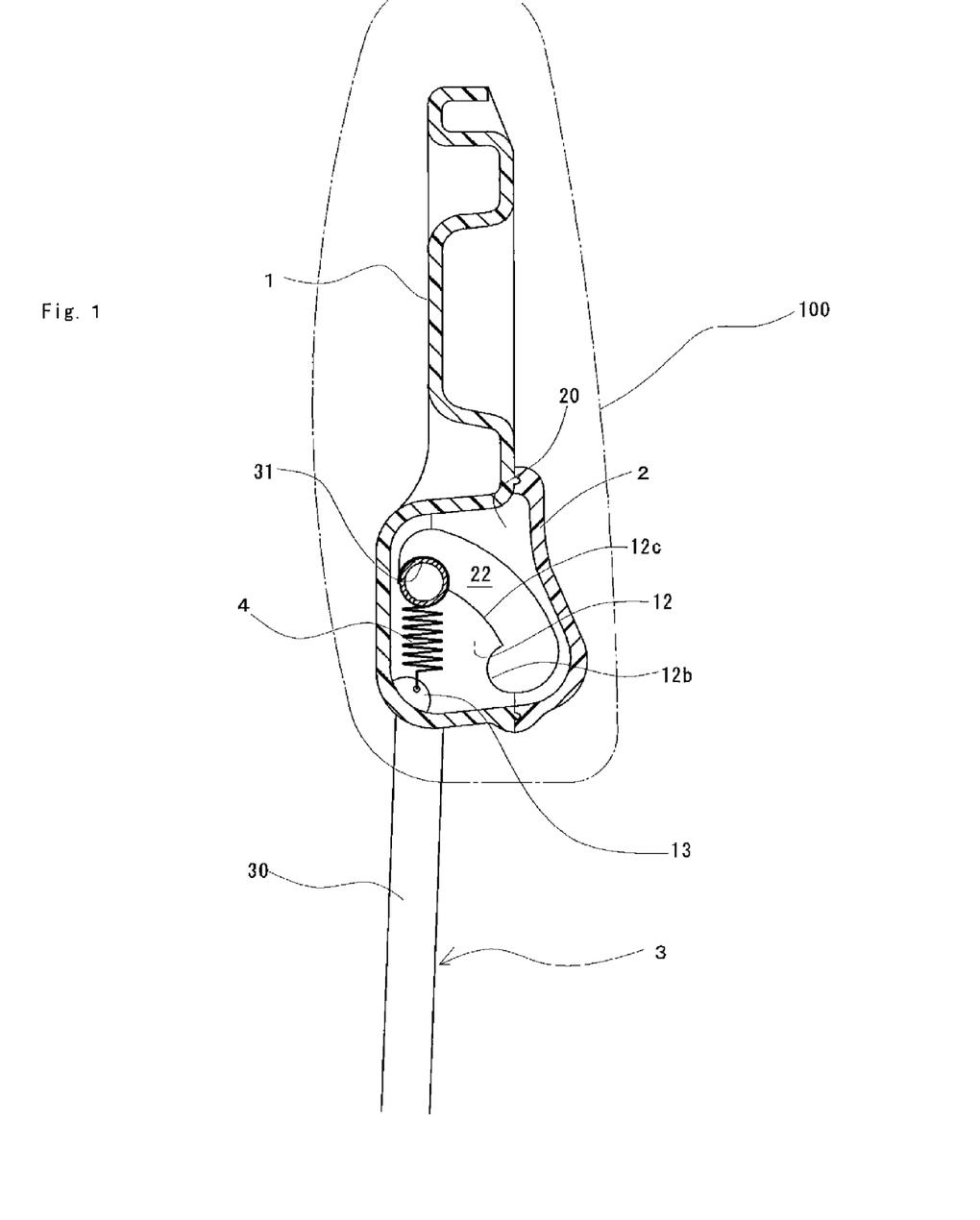
FIG. 1 is a sectional view of a tiltable headrest device according to an embodiment of the present invention at the standing-up position.
Figure 2:
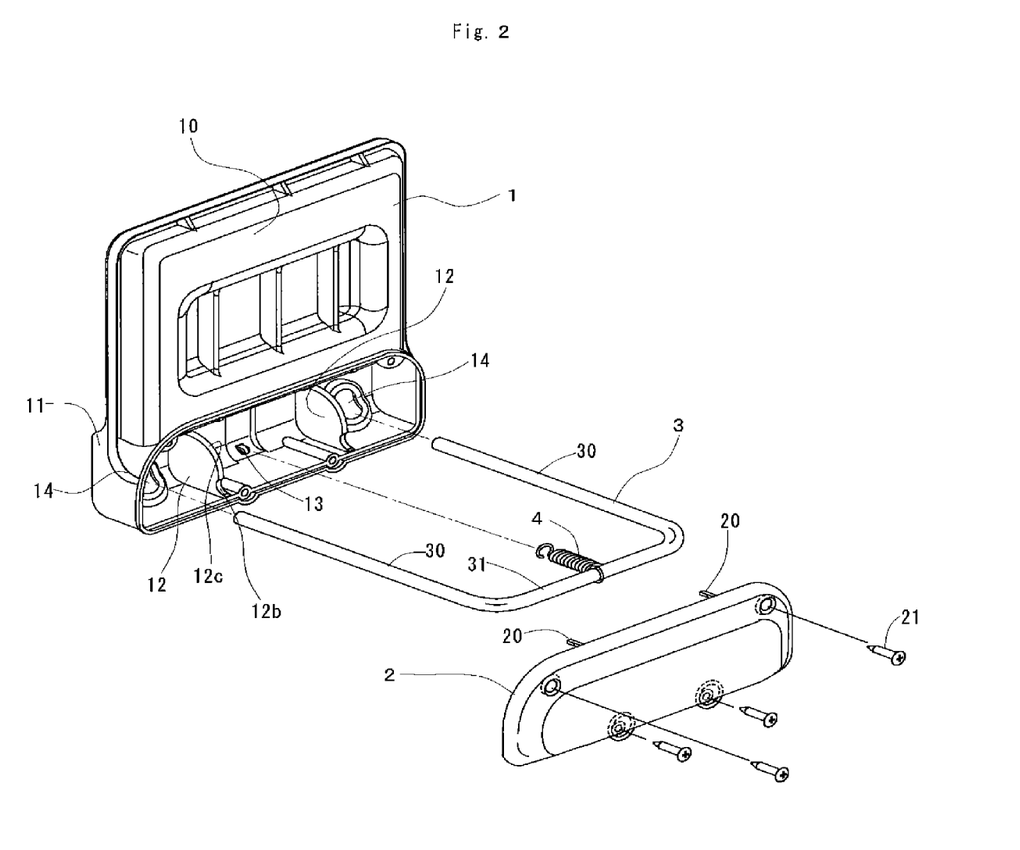
FIG. 2 is a perspective view, exploded in part, of the stay and the core member used in the tiltable headrest device according to the embodiment of the present invention.

FIG. 1 illustrates a sectional view of the tiltable headrest device according to a first embodiment of the present invention, and FIG. 2 illustrates a perspective view thereof exploded in part. The headrest device comprises a core member made of resin and consisting of a first split body 1 and a second split body 2, a stay 3 made of metal and held by the first split body 1, and a coil spring 4 mounted between the first split body 1 and the stay 3. The headrest device is buried in a headrest body 100 comprising a foamed resin member and a covering member.

The first split body 1 comprises a substantially box-shaped head portion 10 and a container 11 connecting continuously with the head portion 10 under the head portion 10, and the second split body 2 is fixed with screws 21 so as to cover an opening of the container 11. A pair of guide portions 12 is integrally formed inside the container 11. The pair of the guide portions 12 each comprises a concave-shaped standing-up locking portion 12a, a concave-shaped falling-down locking portion 12b, and a arc-shaped rail portion 12c for connecting the standing-up locking portion 12a and the falling-down locking portion 12b.

Moreover, a spring mounting portion 13 protruding between the pair of the guide portions 12 is further formed on the first split body 1, and at the outer side of the respective guide portions 12, stay holes 14 are formed at the corner portions of the first split body 1 respectively. One end of the coil spring 4 is held by the spring mounting portion 13.

The second split body 2 has a container shape with a shallow depth and is provided with a pair of ribs 20 which are protruding toward the guide portions 12. Both ends of the pair of the ribs 20 abut against both ends of the guide portions 12, thus a movement space 22 is provided between the guide portions 12 and the pair of the ribs 20.

The stay 3 is formed with a U-shape and consists of a pair of leg portions 30 extending in parallel with each other while being spaced apart from each other and a lateral rod 31 for connecting the pair of the leg portions 30. The pair of the leg portions 30 is inserted into the stay holes 14 from the opening side of the container 11, and the lateral rod 31 is opposed to the guide portion 12. Furthermore, the other end of the coil spring 4 is held by the lateral rod 31, and the lateral rod 31 can move within the movement space 22 in a state that the lateral rod 31 is being urged toward the guide portions 12 by the coil spring 4.

The operation mechanism of the headrest device of the present invention as described above will be described as follows. Firstly, in the case that the headrest body 100 is at the standing-up position, the lateral rod 31 of the stay 3 is locked by the standing-up locking portions 12a of the guide portions 12, as shown in FIG. 1. Since the lateral rod 31 is urged toward the standing-up locking portions 12a by the coil spring 4, the headrest body 100 is fixed at the standing-up position and thus can be used as a headrest.

Figure 3:
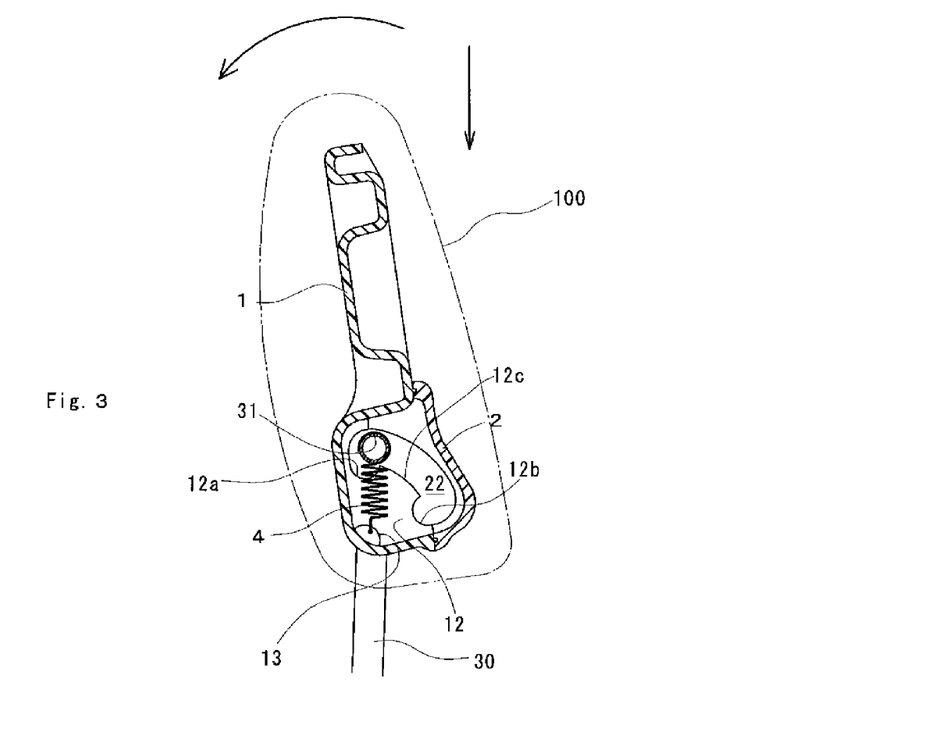
FIG. 3 is a sectional view of the tiltable headrest device according to the embodiment of the present invention at an intermediate position.
Figure 4:
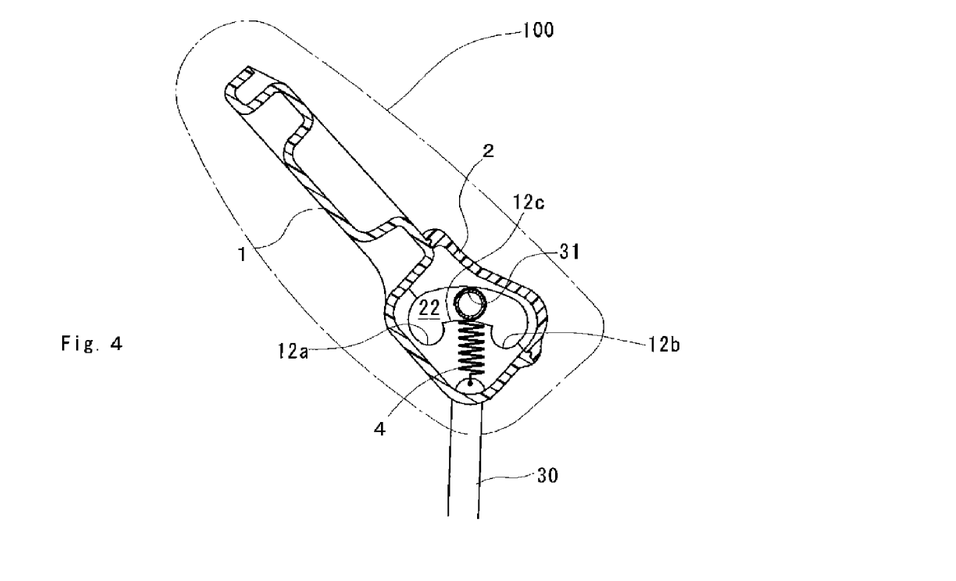
FIG. 4 is a sectional view of the tiltable headrest device according to the embodiment of the present invention at an intermediate position.
Figure 5:
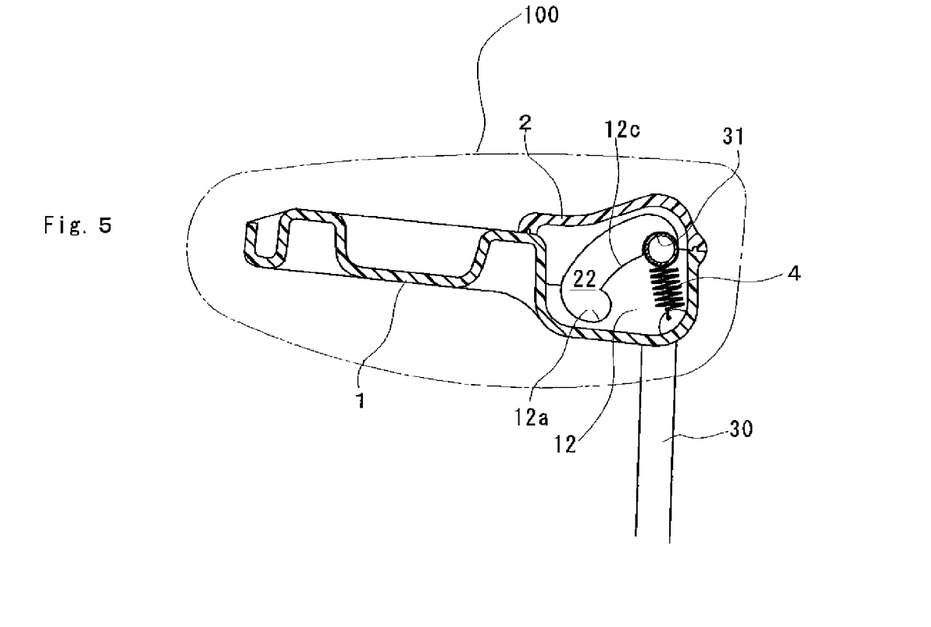
FIG. 5 is a sectional view of the tiltable headrest device according to the embodiment of the present invention at the falling-down position.

When the headrest body 100 is to be lain down, the headrest body 100 is pressed down toward the seatback by overcoming the urging force of the coil spring 4. Then, as shown in FIG. 3, the lateral rod 31 moves upward apart from the standing-up locking portions 12a, thus the headrest body 100 is tilted forward. Thereby, the lateral rod 31 is allowed to move within the movement space 22 while being guided by the rail portions 12c of the guide portions 12, and, by means of deadweight and the urging force of the coil spring 4, the headrest body 100 rotates automatically or is rotated with a small force after the lateral rod 31 passed an intermediate position as shown in FIG. 4. As shown in FIG. 5, the headrest body 100 is held at the falling-down position at which the lateral rod 31 is locked by the falling-down locking portions 12b.

In order to move the headrest body 100 from the falling-down position to the standing-up position once again, the headrest body 100 is pressed down toward the seatback from a state as shown in FIG. 5. Then, since the lateral rod 31 moves upward apart from the falling-down locking portion 12b, the headrest body 100 is rotated backward. This allows the lateral rod 31 to move within the movement space 21 while being guided by the rail portions 12c of the guide portion 12, and, the headrest body 100 can be rotated easily with a small force by means of the urging force of the coil spring 4 after the lateral rod 31 passed the intermediate position as shown in FIG. 4. As shown in FIG. 1, the headrest body 100 is then held at the standing-up position at which the lateral rod 31 is locked by the standing-up locking portion 12a.

Therefore, according to the headrest device of the present embodiment, because the guide portions 12 made of resin and the lateral rod 31 made of metal slidingly contact with each other only when the headrest body 100 is rotating, the occurrence of abnormal noise can be suppressed. Moreover, the headrest device has reduced number of components, thus the number of steps required for assembling process can be effectively reduced. Furthermore, because the distance between the stay holes 14 and the lateral rod 31 is small and the stay holes 14 are provided at the corner portions of the container 11, the movement distance of the leg portions 30 positioned in the stay holes 14 during rotation is short. Accordingly, the length of the stay holes 14 along the rotating direction of the headrest body 100 can be reduced, and thus the appearance quality is improved.

The Second Embodiment

Figure 6:
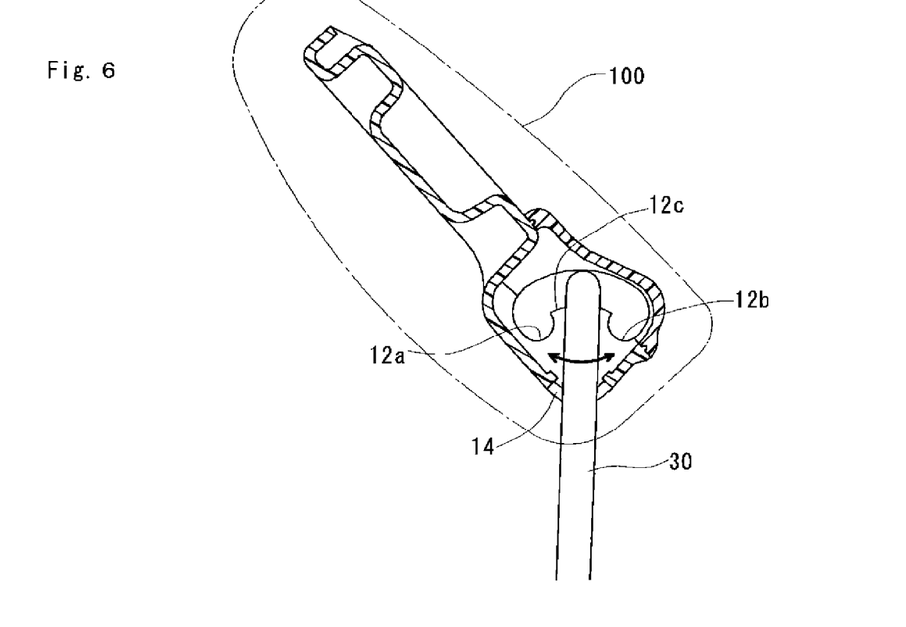
FIG. 6 is a sectional view of the tiltable headrest device according to the embodiment of the present invention at an intermediate position.

In a state where the lateral rod 30 is guided by the rail portions 12c, the headrest device 100 described in the first embodiment can move to left or right in the rotating direction as shown in FIG. 6 by a length of the stay holes 14. Therefore, the rotation of the headrest device 100 may not be stable.

FIGS. 7 to 10 illustrate a headrest device of the present embodiment for solving such a problem. The headrest device of the present embodiment has the same configuration as the first embodiment except that it has a pair of slide members 5 made of resin, and the first split body 1 and the second split body 2 are provided with a left and right pair of first holding ribs 15 and a left and right pair of second holding ribs 23 for holding the slide members 5, respectively. Therefore, the second embodiment will be described below, with the same components as the first embodiment being denoted by the same reference numbers as in the first embodiment.

Figure 7:
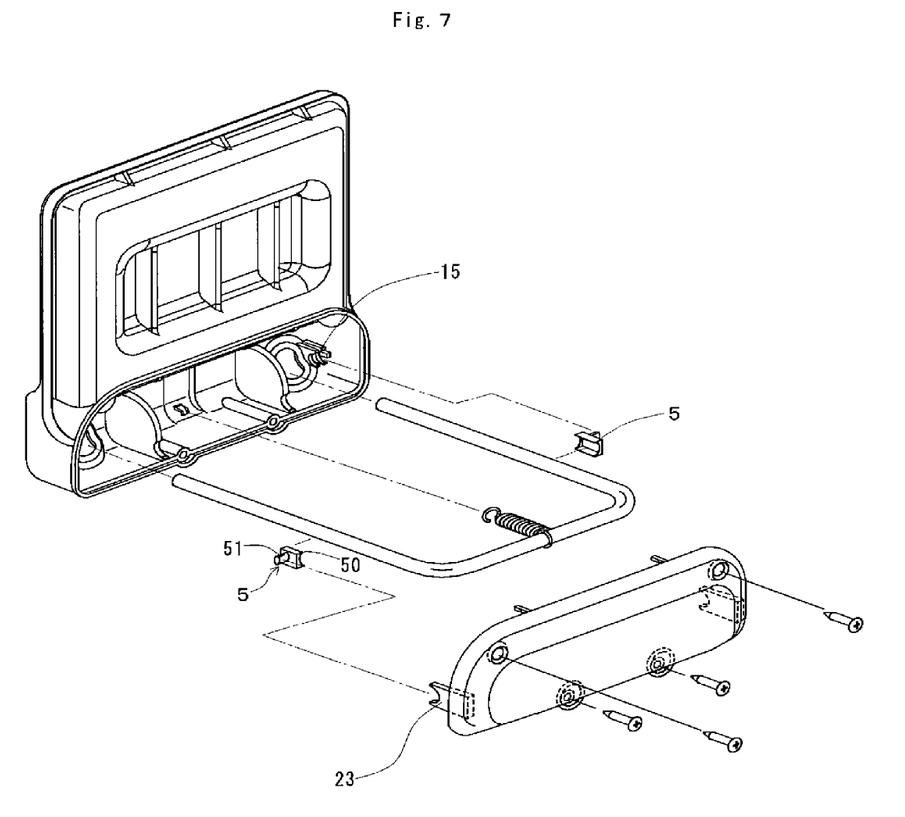
FIG. 7 is a perspective view, exploded in part, of the stay and the core member used in a tiltable headrest device according to a second embodiment of the present invention.

The slide members 5 each comprises a sliding contact portion 50 slidingly contacted with leg portions 30 of the stay 3 and a pin portion 51 protruding outward from the sliding contact portion 50 in a direction parallel to the lateral rod 31.

The first holding ribs 15 and the second holding ribs 23 are formed opposing to each other, and the pin portions 51 is freely rotatably interposed between the first holding ribs 15 and the second holding ribs 23 under a state where the first split body 1 and the second split body 2 are mounted together. Accordingly, the headrest body 100 can freely rotate about the pin portions 51 as an axis.

Figure 8:
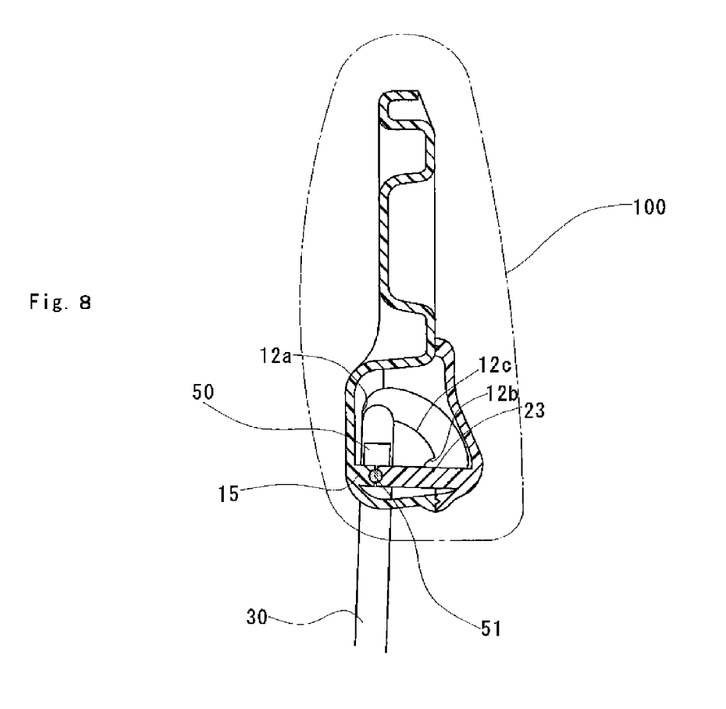
FIG. 8 is a sectional view of the tiltable headrest device according to the second embodiment of the present invention at the standing-up position.

Firstly, when the headrest body 100 is at the standing-up position, as shown in FIG. 8, the lateral rod 31 of the stay 3 is locked by the standing-up locking portions 12a of the guide portions 12. Since the lateral rod 31 is urged toward the standing-up locking portions 12a by the coil spring 4 which is not shown, the headrest body 100 is fixed at the standing-up position and can be used as a headrest.

Figure 9:
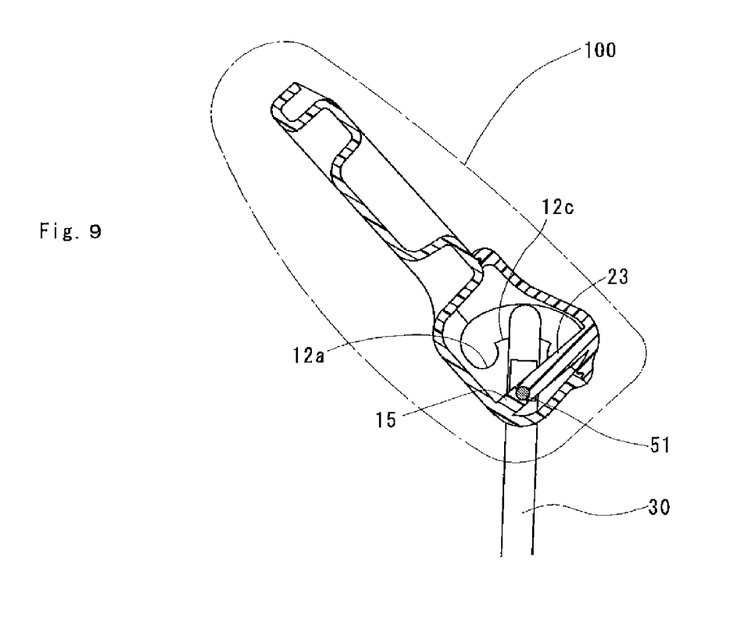
FIG. 9 is a sectional view of the tiltable headrest device according to the second embodiment of the present invention at an intermediate position.
Figure 10:
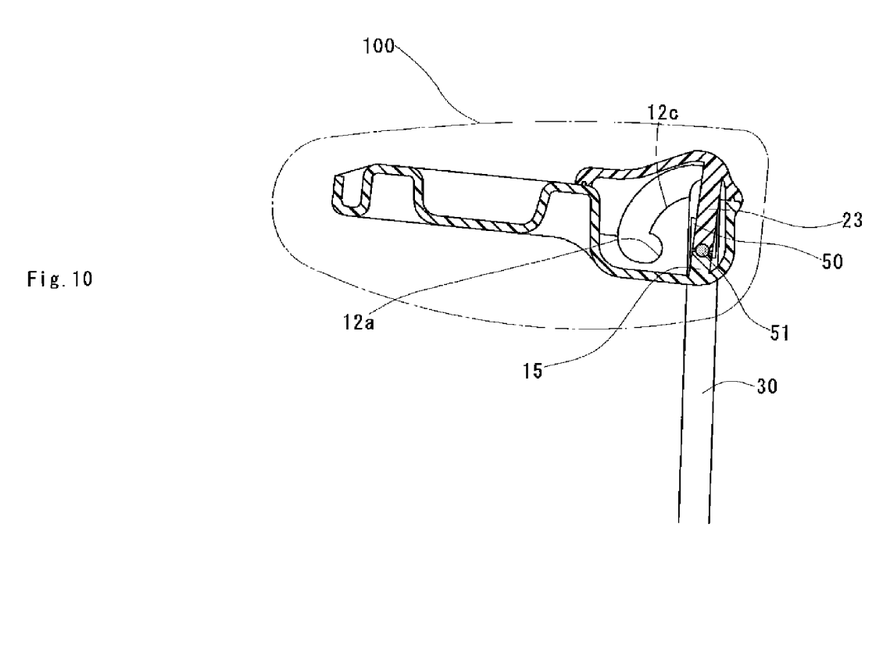
FIG. 10 is a sectional view of the tiltable headrest device according to the second embodiment of the present invention at the falling-down position.

When the headrest body 100 is to be lain down, the headrest body 100 is pressed down toward the seatback by overcoming the urging force of the coil spring 4 which is not shown. Then, as shown in FIG. 3, since the lateral rod 31 moves upward apart from the standing-up locking portion 12a, the headrest body 100 is tilted forward. This allows the lateral rod 31 to move within the movement space 21 while being guided by the rail portions 12c of the guide portions 12, and, by means of deadweight and the urging force of the coil spring 4, the headrest body 100 can rotate automatically or can be rotated by a small force after an intermediate position as shown in FIG. 9 is passed. As shown in FIG. 10, the headrest body 100 is held at the falling-down position at which the lateral rod 31 is locked by the falling-down locking portions 12b.

In order to move the headrest body 100 from the falling-up position to the standing-up position, the headrest body 100 in a state as shown in FIG. 10 is pressed down toward the seatback. Then, since the lateral rod 31 moves upward apart from the falling-down locking portions 12b, the headrest body 100 is rotated backward. This allows the lateral rod 31 to move within the movement space 22 while being guided by the rail portions 12c of the guide portions 12, and, by means of the urging force of the coil spring 4, the headrest body 100 is rotated by a small force after an intermediate position as shown in FIG. 9 is passed. As shown in FIG. 1, the headrest body 100 is held at the standing-up position at which the lateral rod 31 is locked by the standing-up locking portions 12a.

Here, when the headrest body 100 is pressed down toward the seatback and is at the intermediate position as shown in FIG. 9, the slide members 5 slidingly contact along the leg portions 30 and move downward relative to the leg portions 30, and the headrest body 100 rotates about the pin portions 51 as axis. Therefore, according to the headrest device of the present embodiment, the same effect as that of the headrest device of the first embodiment is obtained, and at the same time, the center of rotation is stable so that the movement for falling down or standing up can be stably performed.

Furthermore, since the pin portions 51 serving as the center of rotation are held closing to the stay hole 14, the movement distance of the leg portions 30 positioned in the stay holes 14 during rotation can be further reduced than that of the headrest device of the first embodiment. Therefore, the length of the stay holes 14 in the rotation direction of the headrest body 100 can be further reduced, and thus the appearance quality is further improved.

What is claimed is:

1. A tiltable headrest device comprising:
   a substantially U-shaped stay which includes a pair of leg portions extending substantially in parallel with each other while being spaced apart from each other and a lateral rod for connecting the pair of the leg portions;
   a core member made of resin for surrounding at least the lateral rod of the stay, wherein the core member is held by the stay at a substantially upright position and a folded position;
   slide members are held adjacent to the lateral rod on the pair of the leg portions, each of the slide members includes a slide portion slidable along the leg portion and a pin portion protruding outward from the slide portion to a direction parallel to the lateral rod, wherein holding portions which rotatably hold the pin portions are integrally provided on the core member;
   guide portions which are integrally formed on the core member, each guide portion includes an upright locking portion for locking the lateral rod at the upright position, a folded locking portion for locking the lateral rod at the folded position, and a rail portion for connecting the upright locking portion and the folded locking portion so as to guide the lateral rod; and
   an urging member for pulling the lateral rod toward a direction approaching the guide portions is provided in the core member, the urging member includes a coil spring having two ends held respectively by the lateral rod and a spring mounting portion formed on a lower part of the core member, wherein the lateral rod is pressed against the guide portions by a pulling force of the urging member, the pulling force of the urging member is larger when the lateral rod is located at the rail portions than that when the lateral rod is locked by the upright locking portions or the folded locking portions.

2. The tiltable headrest device according to claim 1, wherein said core member has corner portions at a lower end portion and said holding portions are formed adjacent to the corner portions.

* * * * *